US011124379B2

(12) United States Patent
Kashu (10) Patent No.: US 11,124,379 B2
(45) Date of Patent: Sep. 21, 2021

(54) METHOD OF PRODUCING FILM, AND FILM WINDING APPARATUS

(71) Applicant: Sumitomo Chemical Company, Limited, Tokyo (JP)

(72) Inventor: Koji Kashu, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 239 days.

(21) Appl. No.: 16/281,654

(22) Filed: Feb. 21, 2019

(65) Prior Publication Data
US 2019/0256316 A1    Aug. 22, 2019

(30) Foreign Application Priority Data

Feb. 22, 2018 (JP) .............................. JP2018-030069

(51) Int. Cl.
*B65H 18/10* (2006.01)
*B65H 35/00* (2006.01)
*H01M 10/0525* (2010.01)
*H01M 50/403* (2021.01)

(52) U.S. Cl.
CPC ......... *B65H 35/0093* (2013.01); *B65H 18/10* (2013.01); *B65H 35/008* (2013.01); *H01M 10/0525* (2013.01); *H01M 50/403* (2021.01)

(58) Field of Classification Search
CPC .. B65H 35/008; B65H 35/0093; B65H 18/10; B65H 2301/4148; B65H 2557/62; H01M 50/403; G01N 21/892
See application file for complete search history.

(56) References Cited

U.S. PATENT DOCUMENTS

| 2006/0164647 | A1* | 7/2006 | Shibata | G01N 21/89 356/430 |
| 2010/0294418 | A1* | 11/2010 | Yura | G02F 1/1303 156/64 |
| 2012/0028067 | A1* | 2/2012 | Izaki | B26D 5/02 428/542.8 |
| 2013/0169956 | A1* | 7/2013 | Cano Cediel | G01N 21/8851 356/237.1 |
| 2017/0307542 | A1 | 10/2017 | Watanabe et al. | |

FOREIGN PATENT DOCUMENTS

JP    2014-240816 A    12/2014

* cited by examiner

*Primary Examiner* — Sang K Kim
(74) *Attorney, Agent, or Firm* — Panitch Schwarze Belisario & Nadel LLP (57) ABSTRACT

A method of producing a film is provided. The method involves a winding step including a point-of-interest detecting step including detecting a point-of-interest on the film, a number-of-turns counting step including counting the number of turns of the film wound around a winding core, and a number-of-turns storing step including storing, in association with the number of turns of the film wound around the winding core, a position of the point-of-interest in a direction of transfer of the film. The method eliminates the need for a step of printing on a film for the purpose of locating a point-of-interest on the film.

11 Claims, 10 Drawing Sheets

METHOD OF PRODUCING FILM, AND FILM WINDING APPARATUS

This Nonprovisional application claims priority under 35 U.S.C. § 119 on Patent Application No. 2018-030069 filed in Japan on Feb. 22, 2018, the entire contents of which are hereby incorporated by reference.

TECHNICAL FIELD

One or more embodiments of the present invention relate to a method of producing a film, and also relate to a film winding apparatus configured to wind the film.

BACKGROUND ART

Patent Literature 1 discloses a method of, in an apparatus for producing a film, detecting the position of a point-of-interest on the film. An example of the point-of-interest disclosed in Patent Literature 1 is a defect in a film that would occur during the production of the film.

CITATION LIST

Patent Literature

[Patent Literature 1]
Japanese Patent Application Publication, Tokukai, No. 2014-240816 (Publication date: Dec. 25, 2014)

SUMMARY OF INVENTION

Technical Problem

Patent Literature 1 discloses printing positional information of the point-of-interest on the film such that the positional information and the point-of-interest are aligned with each other along the direction orthogonal to the direction of transfer of the film. In so doing, according to Patent Literature 1, the speed of film transfer sometimes has to be slowed down for the purpose of carrying out printing on the film. Furthermore, the printing necessitates a print head and the like.

Solution to Problem

In order to solve the above issue, a method of producing a film in accordance with one aspect of the present invention includes a winding step including winding the film around a winding core, the winding step including: a point-of-interest detecting step including detecting a point-of-interest on the film; a number-of-turns counting step including counting the number of turns of the film wound around the winding core; and a number-of-turns storing step including storing, in association with the number of turns of the film wound around the winding core, a position of the point-of-interest in a direction of transfer of the film.

In order to solve the above issue, a film winding apparatus in accordance with one aspect of the present invention is a film winding apparatus configured to wind a film around a winding core, including: a point-of-interest sensor configured to detect a point-of-interest on the film; a winding core sensor configured to count the number of turns of the film wound around the winding core; and a storage device configured to store, in association with the number of turns, a position of the point-of-interest in a direction of transfer of the film.

Advantageous Effects of Invention

According to one aspect of the present invention, the position of a point-of-interest is stored in association with the number of turns of a film, and therefore there is no need to print any information on the film in order to specify the position of the point-of-interest on the film. This eliminates the need for slowing the speed of film transfer. Furthermore, one aspect of the present invention makes it possible to specify the position of the point-of-interest on the film without having to use devices such as a print head.

DESCRIPTION OF EMBODIMENTS

Embodiment 1

In this specification, the term "point-of-interest" on a film is intended to mean a portion, of the film, which has to be subjected to some process that is carried out with respect to the film. The point-of-interest is to be detected and located during any of the steps of a film production process.

Figure 1:
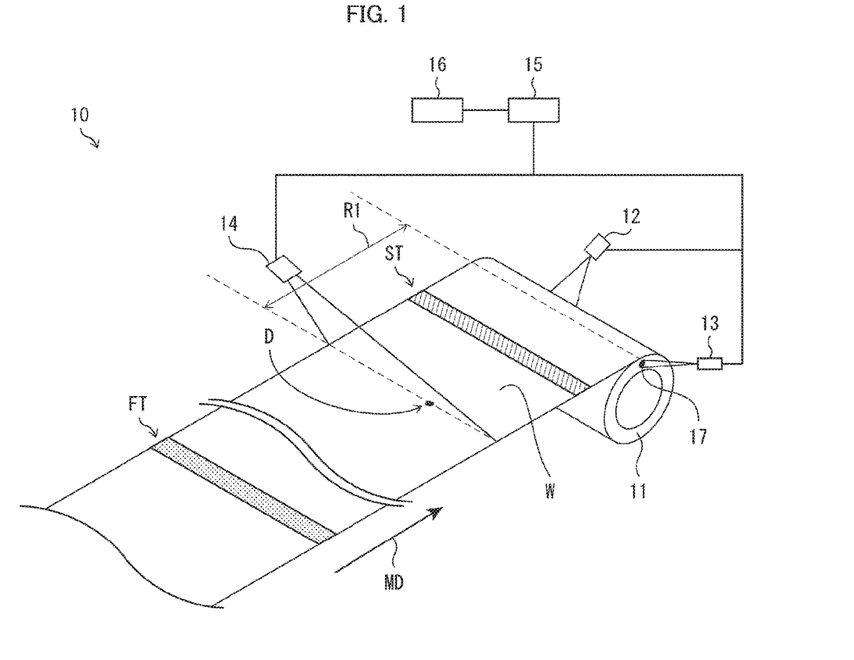
FIG. 1 schematically illustrates a separator winding apparatus in accordance with Embodiment 1 of the present invention.

FIG. 1 schematically illustrates a separator winding apparatus 10, which is an example of a film winding apparatus in accordance with Embodiment 1 of the present invention. The separator winding apparatus 10 includes a core 11, a tape sensor 12, a counting sensor 13, a defect sensor 14, a computing device 15, and a storage device 16. Embodiment 1 deals with an arrangement in which the separator winding apparatus 10 is used to transfer a separator original sheet W (which is a film) and in which the separator original sheet W is wound around the core 11.

In Embodiment 1, the separator original sheet W means a sheet to be slit into two or more separators each of which is for use in, for example, a lithium-ion secondary battery and each of which has a width suitable for use in the lithium-ion secondary battery. In Embodiment 1, the separator original sheet W has a leading-edge marking tape ST and a tail-edge marking tape FT thereon, and has at least one defect D. The leading-edge marking tape ST and the tail-edge marking tape FT may be provided to the separator original sheet W during production of the separator original sheet W. The leading-edge marking tape ST and the tail-edge marking tape FT are not particularly limited, provided that they are capable of being detected by the tape sensor 12, and may be markers, codes, laser-printed information, or the like. The dimensions and shapes of the leading-edge marking tape ST and the tail-edge marking tape FT are not particularly limited either, provided that the leading-edge marking tape ST and the tail-edge marking tape FT are capable of being detected by the tape sensor 12.

Assume that the defect D, which is a point-of-interest in accordance with Embodiment 1, is present between the leading-edge marking tape ST and the tail-edge marking tape FT in the length direction of the separator original sheet W in Embodiment 1. The defect D may be, for example, scaling of a coating from a substrate of the separator original sheet W, agglomeration of the coating, a hole in the separator original sheet W, or the like, which have occurred during the production of the separator original sheet W.

The core 11, which is a winding core in accordance with Embodiment 1, is substantially in the shape of a cylinder, and, in Embodiment 1, has a winding shaft (not illustrated) inserted therein such that the rotation of the winding shaft causes the separator original sheet W to be wound onto the outer peripheral surface of the core 11. The core 11 has at least one mark 17 on its end face.

The tape sensor 12 is a sensor configured to detect the leading-edge marking tape ST and the tail-edge marking tape FT, which are provided on at least one side of the separator original sheet W.

The counting sensor 13 is a number-of-turns counting sensor configured to detect the mark 17 on the end face of the core 11 to thereby count the number of turns of the separator original sheet W wound around the core 11 (i.e., number of rotations of the core 11). The counting sensor 13 always records the number of turns of the separator original sheet W wound around the core 11 while it is in operation. The core 11 is placed such that, when the separator original sheet W has been wound around the core 11 one turn, the mark 17 has made a single pass through a detection range covered by the counting sensor 13. Therefore, every time the mark 17 makes a single pass through the detection range covered by the counting sensor 13, the counting sensor 13 increments the recorded number of turns by one. The mark 17 may be provided on an end face of the winding shaft inserted in the core 11. In a case where the separator original sheet W is wound around a core 11 that has a length that is longer than the width of the separator original sheet W, the mark 17 may be provided on the outer peripheral surface of the core 11 where no separator original sheet W is wound. Provided that the mark 17 is capable of being read by the counting sensor 13, the mark 17 is not particularly limited as to its material, shape, method to be provided, and the like.

The defect sensor 14 is a point-of-interest sensor configured to detect the defect D, which is a point-of-interest on the separator original sheet W. In Embodiment 1, a detection range covered by the defect sensor 14 extends over the entire width of the front side of the separator original sheet W; however, the detection of the defect D may be carried out also over the entire width of the back side of the separator original sheet W, in addition to the front side. Note that, during the time from when a certain point on the separator original sheet W passes through the detection range covered by the defect sensor 14 to when the certain point on the separator original sheet W is wound onto the core 11, the separator original sheet W is transferred by distance R1.

The computing device 15 is a device configured to collect detection results from the tape sensor 12, the counting sensor 13, and the defect sensor 14, and carry out computing to associate the detection results with each other. The computing device 15 is connected to the tape sensor 12, the counting sensor 13, and the defect sensor 14 such that the computing device 15 is capable of exchanging data with the tape sensor 12, the counting sensor 13, and the defect sensor 14.

The storage device 16 is a device configured to store therein information of the detection results, which are from the tape sensor 12, the counting sensor 13, and the defect sensor 14, respectively and which have been associated with each other by the computing device 15. The computing device 15 and the storage device 16 are connected to each other such that they are capable of exchanging data with each other.

When the defect sensor 14 has detected the defect D, the computing device 15 causes the storage device 16 to store the number of turns recorded by the counting sensor 13, as the number of turns corresponding to the defect D. That is, the storage device 16 stores the position of the defect D in association with the number of turns corresponding to the defect D. If two or more defects D are detected from the separator original sheet W, the storage device 16 stores the number of turns corresponding to each of the defects D. Furthermore, the computing device 15 causes the storage device 16 to store information about the number of turns at a point in time in which the tail-edge marking tape FT was detected by the tape sensor 12. That is, the storage device 16 stores the total number of turns of the separator original sheet W. The storage device 16 may also store information such as the size, type, and/or the like of the defect D, detected by the defect sensor 14, in addition to the number of turns corresponding to the defect D.

Figure 2:
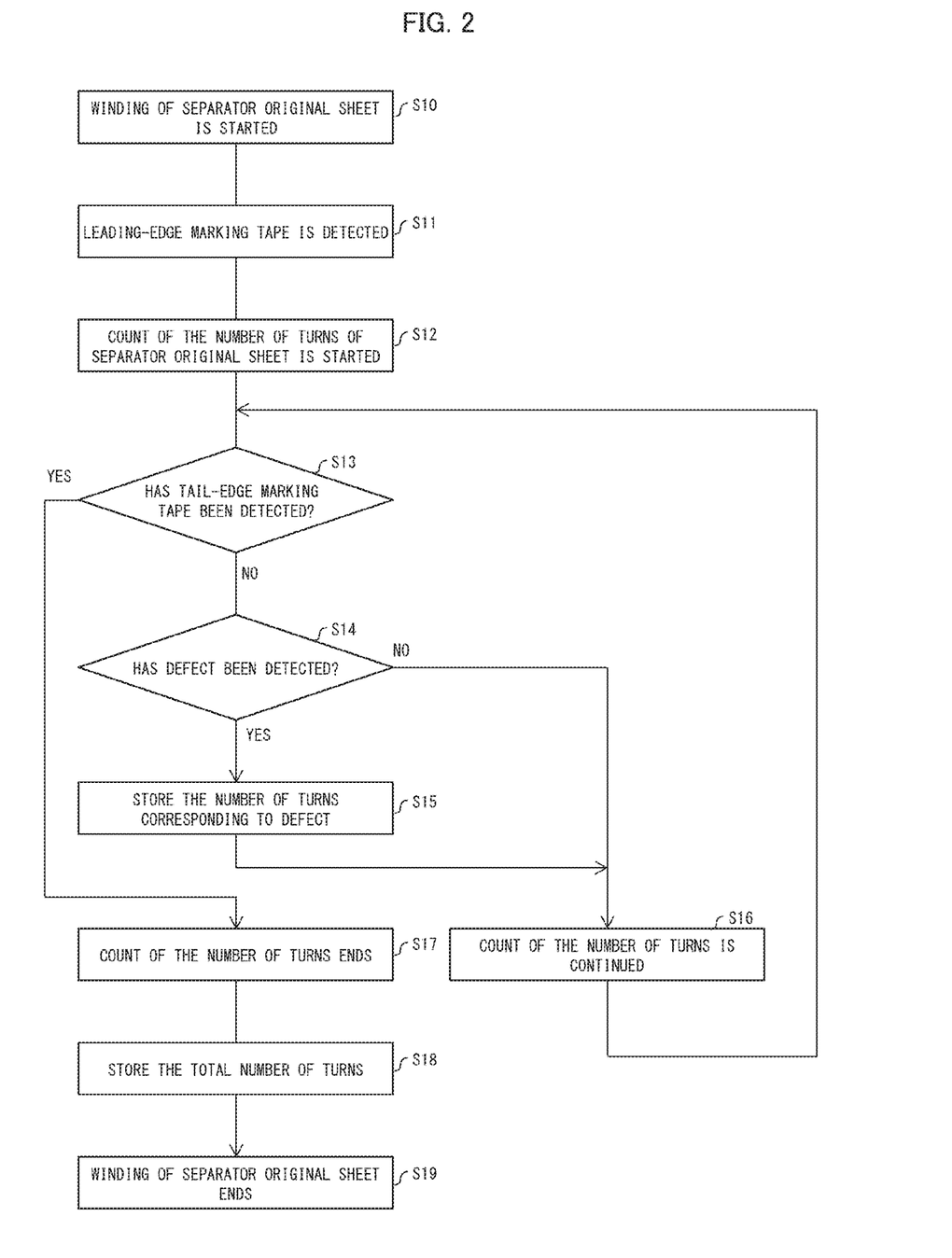
FIG. 2 is a flowchart showing a winding step, including winding a separator, in accordance with Embodiment 1 of the present invention.

FIG. 2 is a flowchart showing a method of winding the separator original sheet W with the use of the separator winding apparatus 10 in accordance with Embodiment 1. The following description will discuss a specific method of winding the separator original sheet W around the core 11, with reference to FIGS. 1 and 2.

First, the rotation of the core 11 is started, and winding of the separator original sheet W transferred into the separator winding apparatus 10 is started (step S10). The separator original sheet W is wound around the core 11, and is thereby transferred in the MD (machine direction) indicated by the arrow in FIG. 1. Note here that, for example, the separator winding apparatus 10 may be provided immediately downstream of a coating apparatus which is for forming a functional layer on a substrate of the separator original sheet W. The winding of the separator original sheet W may be started concurrently with the start of operations of the tape sensor 12, the counting sensor 13, and the defect sensor 14.

Next, the leading-edge marking tape ST on the separator original sheet W is detected by the tape sensor 12 (step S11). The computing device 15 causes the counting sensor 13 to count the number of rotations of the core 11 from when the tape sensor 12 detected the leading-edge marking tape ST. In this way, the separator winding apparatus 10 starts counting the number of turns of the separator original sheet W (step S12).

Over a period of time during which the number of turns is counted, the tape sensor 12 continues to monitor the presence or absence of detection of the tail-edge marking tape FT (step S13). As long as the tape sensor 12 does not detect the tail-edge marking tape FT, the defect sensor 14 continues to monitor the presence or absence of a defect D (step S14).

If the defect sensor 14 has detected the defect D, the computing device 15 reads, from the counting sensor 13, the number of rotations of the core 11 at a point in time of the detection of the defect D, and thereby calculates the number of turns at the point in time of the detection of the defect D. Then, the computing device 15 causes the storage device 16 to store the calculated number of turns in association with information about the defect D (step S15). After that, count of the number of turns is continued (step S16), and the process returns to step S13. If no defect D is detected in step S14, the process directly proceeds to step S16.

It should be noted that the number of turns stored in step S15 may be the number of turns at a point in time in which the separator original sheet W has been transferred by distance R1 from the point in time of the detection of the defect D by the defect sensor 14. This makes it possible to more accurately specify the position of the defect D at a point in time in which the portion containing the defect D of the separator original sheet W was wound around the core 11.

The separator winding apparatus 10 may be configured such that, based on the transfer speed of the separator original sheet W and the time elapsed from the detection of the defect D by the defect sensor 14, the separator winding apparatus 10 determines that the separator original sheet W has been transferred by distance R1. The separator winding apparatus 10 may include a rotary encoder for measuring the distance traveled by the separator original sheet W, in order to detect that the separator original sheet W has been transferred by distance R1.

Note that the separator original sheet W shows no or little expansion or shrinkage during the transfer of the separator original sheet W by distance R1. Therefore, it is inferred that, even in a case where the rotary encoder or the like is used to measure the distance traveled by the separator, the management of the defect D based on the number of turns is little influenced.

The number of turns counted by the counting sensor 13 may be calculated as a decimal fraction. For example, the number of turns can be calculated as a decimal fraction by carrying out the following processes within the computing device 15. First, the aforementioned rotary encoder is used to measure a separator length transferred during the n-th rotation, and the measured length is recorded. Next, assume that a separator length transferred during the n+1-th rotation is equal to the separator length transferred during the n-th rotation. Next, the increment in transferred separator length after the n-th rotation is divided by the separator length transferred during the n-th rotation (i.e., which is assumed to be equal to the separator length transferred during the n+1-th rotation). This makes it possible to obtain a number(s) after the decimal point corresponding to the n+1-th rotation. By calculating the number of turns as a decimal fraction in this manner, it is possible to more precisely associate the number of turns with the position of a defect.

If the tape sensor 12 has detected the tail-edge marking tape FT in step S13, the computing device 15 causes the counting sensor 13 to stop counting the number of rotations of the core 11 at a point in time in which the tail-edge marking tape FT was detected by the tape sensor 12. This ends the count of the number of turns of the separator original sheet W wound by the separator winding apparatus 10 (step S17).

Immediately after step S17, the computing device 15 causes the storage device 16 to store the number of turns at a point in time in which the count of the number of turns ended, that is, the total number of turns of the separator original sheet W (step S18). Lastly, the rotation of the core 11 is stopped, and thereby the winding of the separator original sheet W by the separator winding apparatus 10 ends (step S19).

For example, assume that the defect sensor 14 detected only one defect D at a point in time in which the number of turns was 50, and that the total number of turns was 100. In this case, the storage device 16 stores the value "50" as the number of turns corresponding to the defect D, and stores the value "100" as the total number of turns. This makes it possible to store the position of the defect D in the direction of transfer of the separator original sheet W in association with the number of turns.

Figure 3:
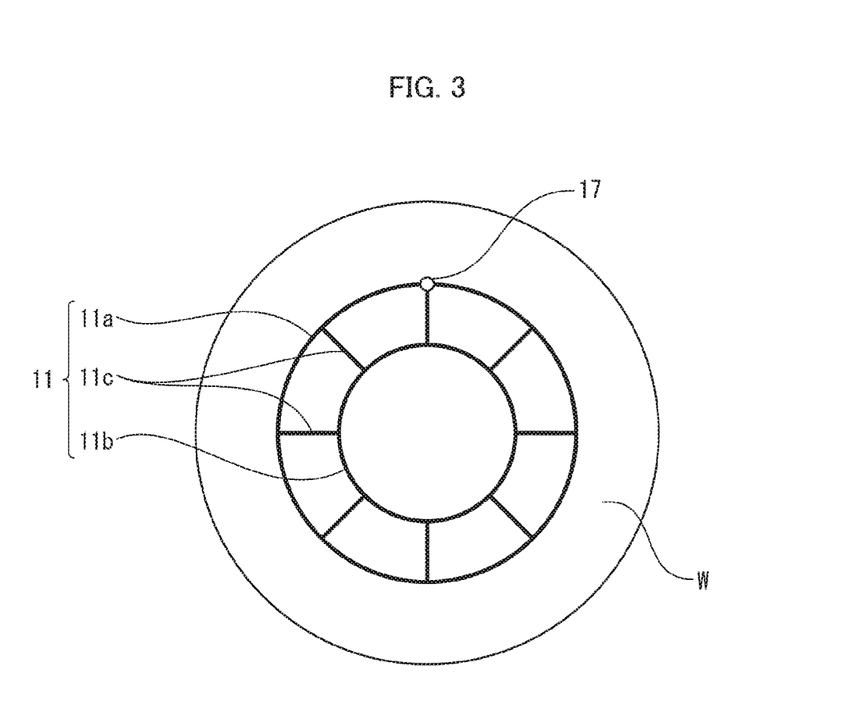
FIG. 3 is an end view schematically illustrating a winding core in accordance with Embodiment 1 of the present invention.

FIG. 3 is an end view schematically illustrating a structure of the core 11 in accordance with Embodiment 1 and a structure of a roll obtained by winding the separator original sheet W around the core 11. The core 11 includes: an outer peripheral part 11a which has an outer peripheral surface on which the separator original sheet W is wound; an inner peripheral part 11b for receiving the winding shaft; and a plurality of ribs 11c extending in radial directions from the center and connecting the outer peripheral part 11a and the inner peripheral part 11b. In Embodiment 1, the number of the ribs 11c is eight, and the ribs 11c are provided such that the whole circumference of the core 11 is substantially divided into eight. The mark 17 is provided on an end face of the outer peripheral part 11a.

In Embodiment 1, the counting sensor 13 detects the mark 17 and thereby the number of turns of the separator original sheet W is counted. Note, however, that this does not imply any limitation, and the following arrangement may be employed: the counting sensor 13 increments the number of turns every time the counting sensor 13 detects each rib 11c and thereby counts the number of turns of the separator original sheet W. This makes it possible to more precisely specify the position of the defect D in the length direction of the separator original sheet W. Alternatively, the above effect can be achieved by the following arrangement: two or more marks 17 are provided on the end face of the core 11 and these marks 17 are read by the counting sensor 13, instead of detecting the ribs 11b. The marks 17 in this arrangement, provided to the end face of the core 11, are preferably substantially equally spaced from each other.

Figure 4:
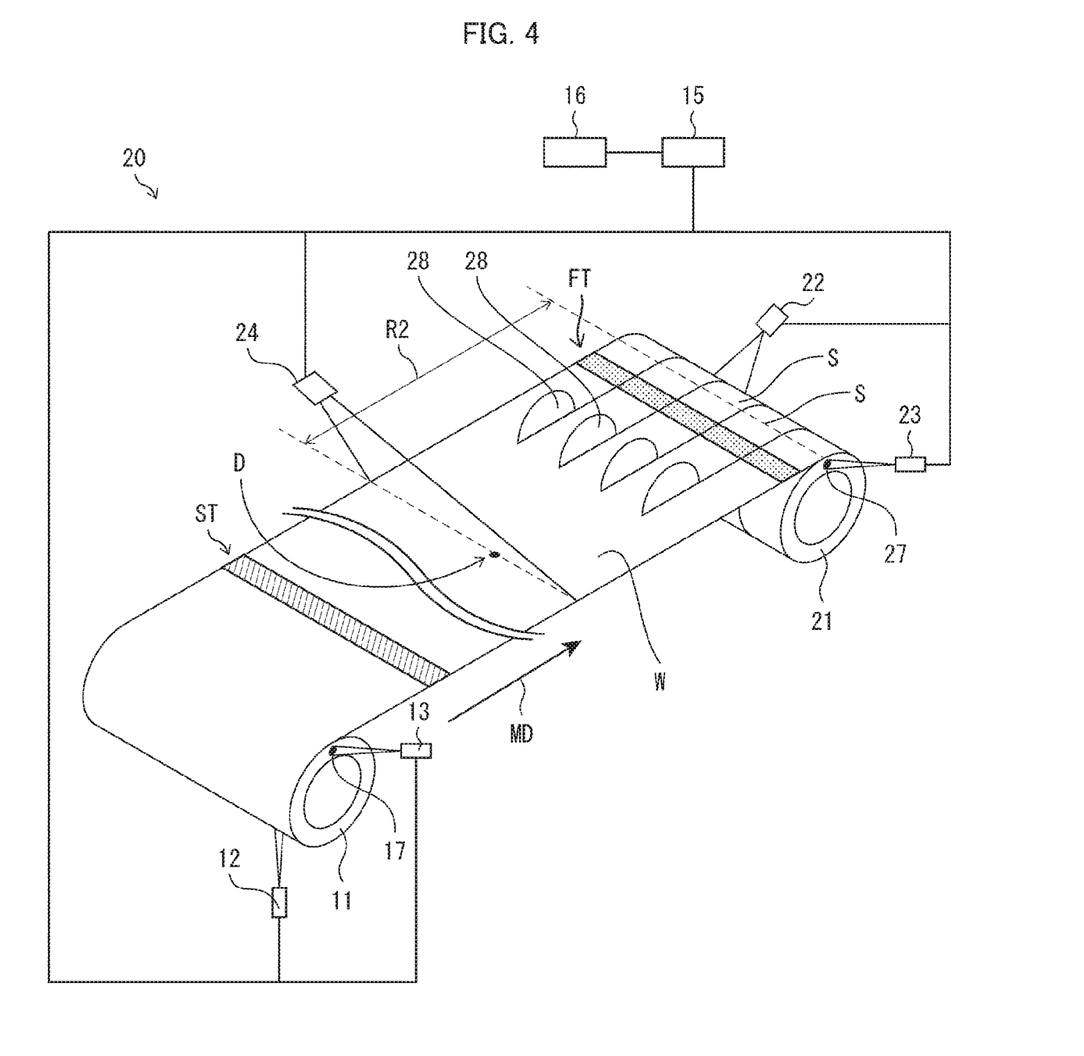
FIG. 4 schematically illustrates another separator winding apparatus in accordance with Embodiment 1 of the present invention.

FIG. 4 schematically illustrates another separator winding apparatus (separator winding apparatus 20) in accordance with Embodiment 1. The separator winding apparatus 20 includes a plurality of cores 21, a tape sensor 22, a counting sensor 23, a defect sensor 24, and a cutter 28.

The separator winding apparatus 20 includes the core 11 on which the separator original sheet W has been wound by the foregoing separator winding apparatus 10 prior to winding by the separator winding apparatus 20. The separator winding apparatus 20 is configured to: wind off the separator original sheet W from the core 11 (which is a wind-off core); slit the separator original sheet W into slit separators S which are strip-shaped films; and then wind the slit separators S around the cores 21 (which are winding cores). The separator winding apparatus 20 may be a slitter.

Each core 21 may be equal in shape and dimensions to the foregoing core 11, except for the width of the outer peripheral surface on which a slit separator S is wound. The cores 21 may have respective different diameters. In Embodiment 1, a single winding shaft is inserted into the cores 21; however, the cores 21 may be placed on respective different winding shafts and the slit separators S may be wound around the respective cores 21. The cores 21 also have a mark 27 on an end face.

The tape sensor 22 and the counting sensor 23 may be equal in configuration and function to the foregoing sensor 12 and the counting sensor 13, respectively. The defect sensor 24 is different from the defect sensor 14 only in that the defect sensor 24 is capable of determining the position of a defect D in the width direction of the separator original sheet W.

The cutter 28 slits the separator original sheet W, while being transferred, into a plurality of slit separators S each having a specified width. In Embodiment 1, the separator winding apparatus 20 includes four such cutters 28, and therefore five slit separators S are obtained from a single separator original sheet W with the use of the separator winding apparatus 20. Note, however, that this does not imply any limitation. The number of cutters 28 may be more than or less than five, and the number of slit separators S may increase or decrease depending on the number of the cutters 28.

Note that, during the time from when a certain point on the separator original sheet W passes through a detection range covered by the defect sensor 24 to when the certain point on the slit separators S is wound onto any of the cores 21, the separator original sheet W (or slit separators S) is transferred by distance R2.

In Embodiment 1, the tape sensor 12 and the counting sensor 13, which were used in the separator winding apparatus 10, may continue to be used on the winding-off side (that is, on the core 11-side) of the separator winding apparatus 20 when the separator winding apparatus 20 is used. In this case, the tape sensor 12 detects a tape on the separator original sheet W which has been wound off, whereas the counting sensor 13 serves as a counting sensor for counting how many turns of the separator original sheet W have been wound off (such a number of turns is hereinafter referred to as the number of unwound turns).

The tape sensors 12 and 22, the counting sensors 13 and 23, the defect sensor 24, and the computing device 15 are capable of exchanging data of the sensors' detection results and data of the number of turns with each other. The storage device 16 is capable of exchanging data with the computing device 15, and stores therein the data that has been obtained during winding of the separator original sheet W by the foregoing separator winding apparatus 10.

Figure 5:
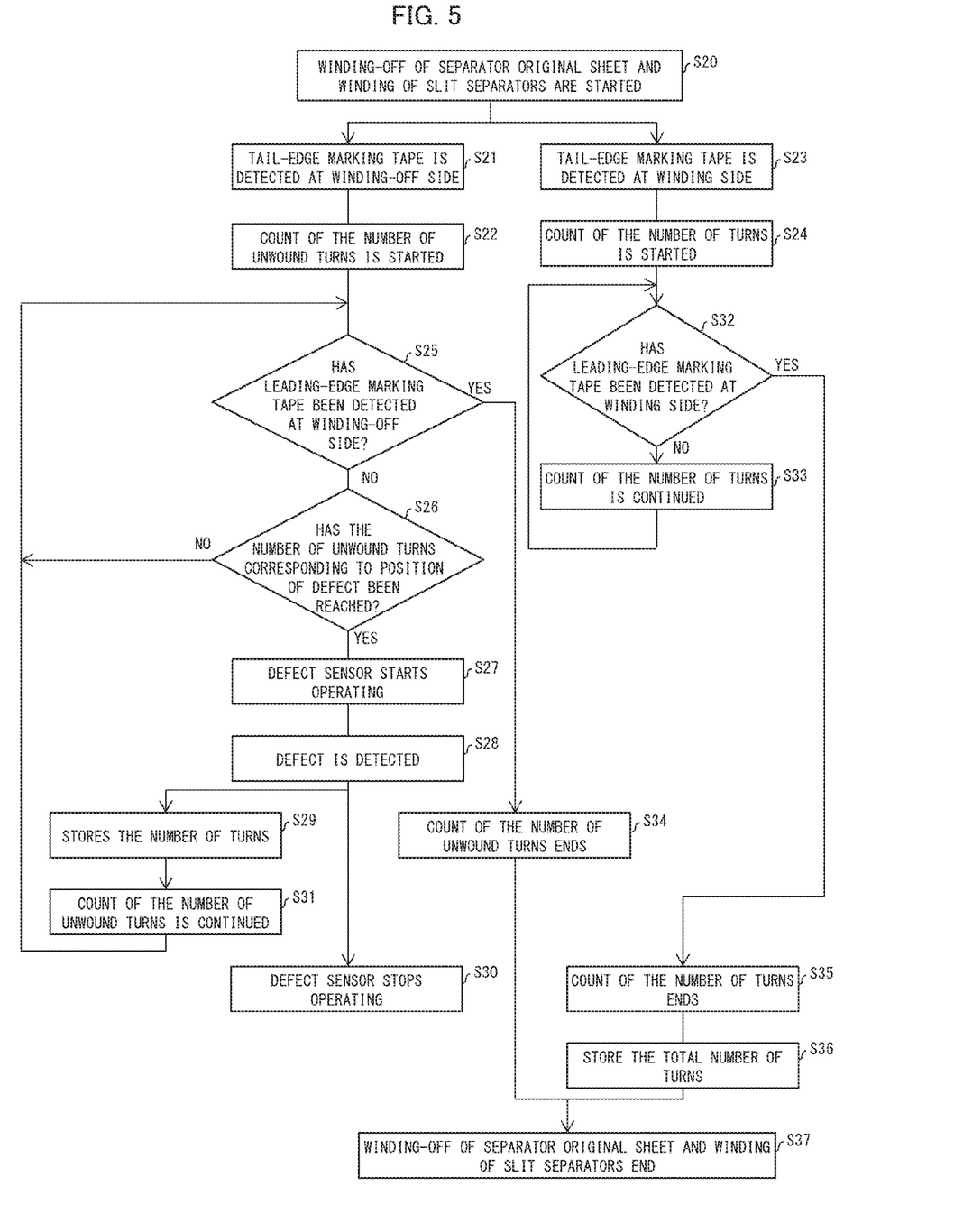
FIG. 5 is a flowchart showing a slitting step, including slitting a separator, in accordance with Embodiment 1 of the present invention.

FIG. 5 is a flowchart showing a method of winding a plurality of slit separators S, obtained by slitting a separator original sheet W wound off from the core 11, around the respective cores 21, with the use of the separator winding apparatus 20 in accordance with Embodiment 1. The following description will specifically discuss a method of slitting the separator original sheet W and a method of winding the slit separators S, with reference to FIGS. 4 and 5.

First, winding-off of the separator original sheet W from the core 11 and winding of the slit separators S around the cores 21 are started (step S20). Note here that, in the separator original sheet W wound around the core 11, a portion provided with the leading-edge marking tape ST is located closer to the center of the core 11 than a portion provided with the tail-edge marking tape FT is to the center of the core 11, and therefore the tape sensor 12 detects the tail-edge marking tape FT first (step S21). The computing device 15 causes the counting sensor 13 to count the number of rotations of the core 11 from when the tape sensor 12 detected the tail-edge marking tape FT. In this way, the separator winding apparatus 20 starts counting how many turns of the separator original sheet W have been wound off from the core 11 (such a number is hereinafter referred to as the number of unwound turns of the separator original sheet W) (step S22).

In so doing, the number of unwound turns may be counted in the following manner: the computing device 15 reads the total number of turns of the separator original sheet W from the storage device 16; and the computing device 15 decrements the total number of turns instead of incrementing the number of unwound turns. For example, in a case of the aforementioned example, count of the number of unwound turns may be such that: the total number of turns (i.e., 100) is decremented by one every time the counting sensor 13 detects that a length, corresponding to one rotation of the core 11, of the separator original sheet W has been wound off.

After that, the separator original sheet W is slit into a plurality of slit separators S by the cutter 28, and the slit separators S are wound around the respective cores 21. As such, also at the winding side, that is, also at the core 21-side, the tail-edge marking tape FT is detected by the tape sensor 22 (step S23). The computing device 15 causes the counting sensor 23 to count the number of rotations of at least one of the cores 21 from when the tape sensor 22 detected the tail-edge marking tape FT (step S24). In this way, the separator winding apparatus 20 starts counting the number of turns of at least one of the slit separators S (step S24). Note that, provided that the slit separators S are wound around the respective cores 21 at equal speeds, the numbers of turns of the slit separators S on all the cores 21 can be detected at once by detecting the number of turns of one of the slit separators S wound around one of the cores 21.

Over a period of time during which the number of unwound turns is counted, the tape sensor 12 continues to monitor the presence or absence of detection of the leading-edge marking tape ST (step S25). As long as the tape sensor 12 does not detect the leading-edge marking tape ST, the counting sensor 13 continues to count the number of unwound turns until the number of unwound turns corresponding to the defect D is reached (step S26).

When the number counted by the counting sensor 13 has reached the number of unwound turns corresponding to the defect D, the defect sensor 24 starts operating (step S27). In a case of the foregoing example, when the total number of turns (i.e., 100) has been decremented to the number "50" associated with the defect D, the defect sensor 24 starts operating. After that, the defect D is detected and, at the same time, the position of the defect D in the width direction of the separator original sheet W is detected, by the defect sensor 24 (step S28).

After that, the computing device 15 reads, from the counting sensor 23, the number of rotations of the at least one core 21 at a point in time of the detection of the defect D by the defect sensor 24, and thereby calculates the number of turns at the point in time of the detection of the defect D. In addition to this calculation, the computing device 15 determines, based on the result of the detection of the defect D by the defect sensor 24, which of the slit separators S contains the defect D.

Next, the computing device 15 causes the storage device 16 to store therein data of a slit separator S that contains the defect D and data of the number of turns of the at least one slit separator S received from the counting sensor 23, in association with each other (step S29). That is, the storage device 16 stores therein the presence or absence of the defect D in regard to each of the cores 21 in association with (i) the position of the defect D in the direction of transfer of the slit separators S and (ii) the number of turns of the slit separator S.

For example, assume that the defect sensor 24 detected only one defect D at a point in time in which the number of turns was 60, that the defect was found to be contained in the second slit separator S, and that the total number of turns was 120. In this case, the storage device 16 stores the value "60" as the number of turns corresponding to the defect D, stores the value "2" as data of the slit separator S that contains the defect, and stores the value "120" as the total number of turns. This makes it possible to store the position of the defect D in the direction of transfer of the slit separators S and the data of the slit separator S containing the defect D each in association with the number of turns.

It should be noted that the number of turns stored in step S29 may be the number of turns at a point in time in which the separator original sheet W (or slit separator S) has been transferred by distance R2 from the point in time of the detection of the defect D by the defect sensor 24. The separator winding apparatus 20 may determine that the separator original sheet W (or slit separator S) has been transferred by distance R2 in the same manner as the separator winding apparatus 10 determining that the separator original sheet W has been transferred by distance R1.

Next, the defect sensor 24 stops operating (step S30), and the counting sensor 13 continues to count the number of unwound turns (step S31). If the number of unwound turns corresponding to the defect D is not reached in step S26, the process directly proceeds to step S31.

From step S25 through step S31, the tape sensor 22 continues to monitor the presence or absence of detection of the leading-edge marking tape ST (step S32). As long as the tape sensor 22 does not detect the leading-edge marking tape ST, the counting sensor 23 continues to count the number of turns (step S33).

If the tape sensor 12 has detected the leading-edge marking tape ST in step S25, the counting sensor 13 stops operating, and thereby the count of the number of unwound turns of the separator original sheet W by the separator winding apparatus 20 ends (step S34). Similarly, if the tape sensor 22 has detected the leading-edge marking tape ST in step S32, the counting sensor 23 stops operating, and thereby the count of the number of turns of the slit separator S by the separator winding apparatus 20 ends (step S35).

Immediately after step S35, the computing device 15 causes the storage device 16 store therein the number of turns at a point in time in which the count of the number of turns ends, that is, the total number of turns of the slit separator S (step S36). After the completion of steps S34 and S36, the core 11 and the cores 21 stop rotating, and thereby the winding-off of the separator original sheet W and the winding of the slit separators S by the separator winding apparatus 20 end (step S37).

Figure 6:
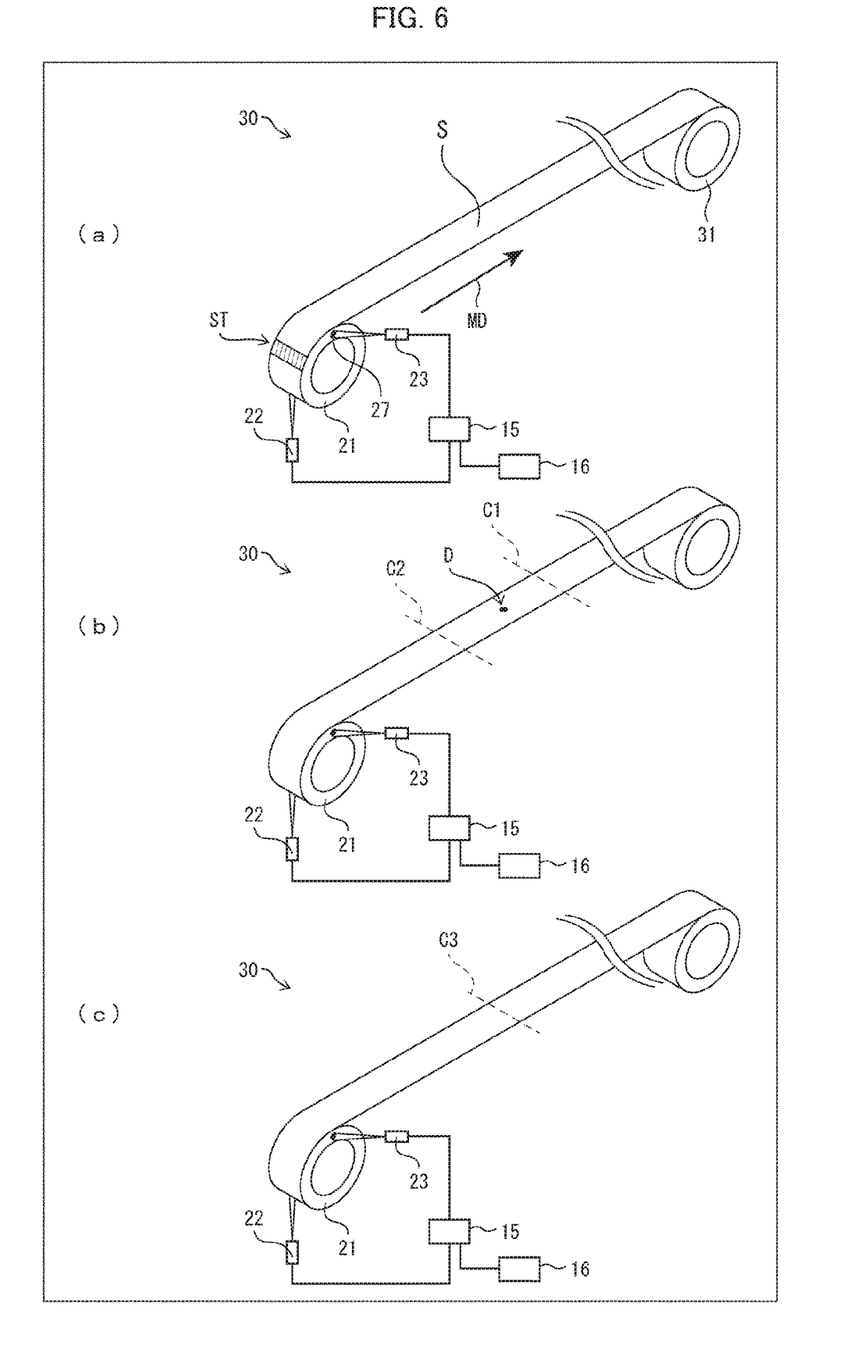
FIG. 6 schematically illustrates a separator rewinding apparatus in accordance with Embodiment 1 of the present invention, and schematically illustrates how a defect is dealt with with the use of the rewinding apparatus.

FIG. 6 schematically illustrates a rewinding apparatus 30 in accordance with Embodiment 1. (a) to (c) of FIG. 6 sequentially illustrate how the defect D is dealt with in Embodiment 1. The rewinding apparatus 30 includes a core 31, which serves as a rewinding core. The rewinding apparatus 30 is an apparatus configured to wind off a slit separator S, which contains a defect D, from a core 21, rewind the slit separator S around the core 31, and, while the slit separator S is being rewound, remove the defect D from the slit separator S. Therefore, slit separators S containing no defect D, for example, in a case of the foregoing example, slit separators S wound around cores 21 other than the second core 21, do not necessarily have to be subjected to such a process using the rewinding apparatus 30.

The core 31 may be identical to the core 21 or may be different in diameter from the core 21. The core 31 may be equal in shape and dimensions to the foregoing core 11 except for the width of the outer peripheral surface onto which the slit separator S is wound. The core 31 may be different in diameter from the core 11. The core 31 does not have to have a mark on its end face.

In Embodiment 1, the tape sensor 22 and the counting sensor 23, which were used in the separator winding apparatus 20, may continue to be used on the winding-off side (that is, on the core 21-side) of the rewinding apparatus 30 when the rewinding apparatus 30 is used. In this case, the tape sensor 22 detects a tape on the slit separator S which has been wound off, whereas the counting sensor 23 serves as a counting sensor for counting how many turns of the slit separator S have been wound off (such a number is hereinafter referred to as the number of unwound turns).

The tape sensor 22, the counting sensor 23, and the computing device 15 are capable of exchanging data of the sensors' detection results and data of the number of unwound turns with each other. The storage device 16 is capable of exchanging data with the computing device 15, and stores therein the data obtained during winding of the slit separator S by the foregoing separator winding apparatus 20.

Figure 7:
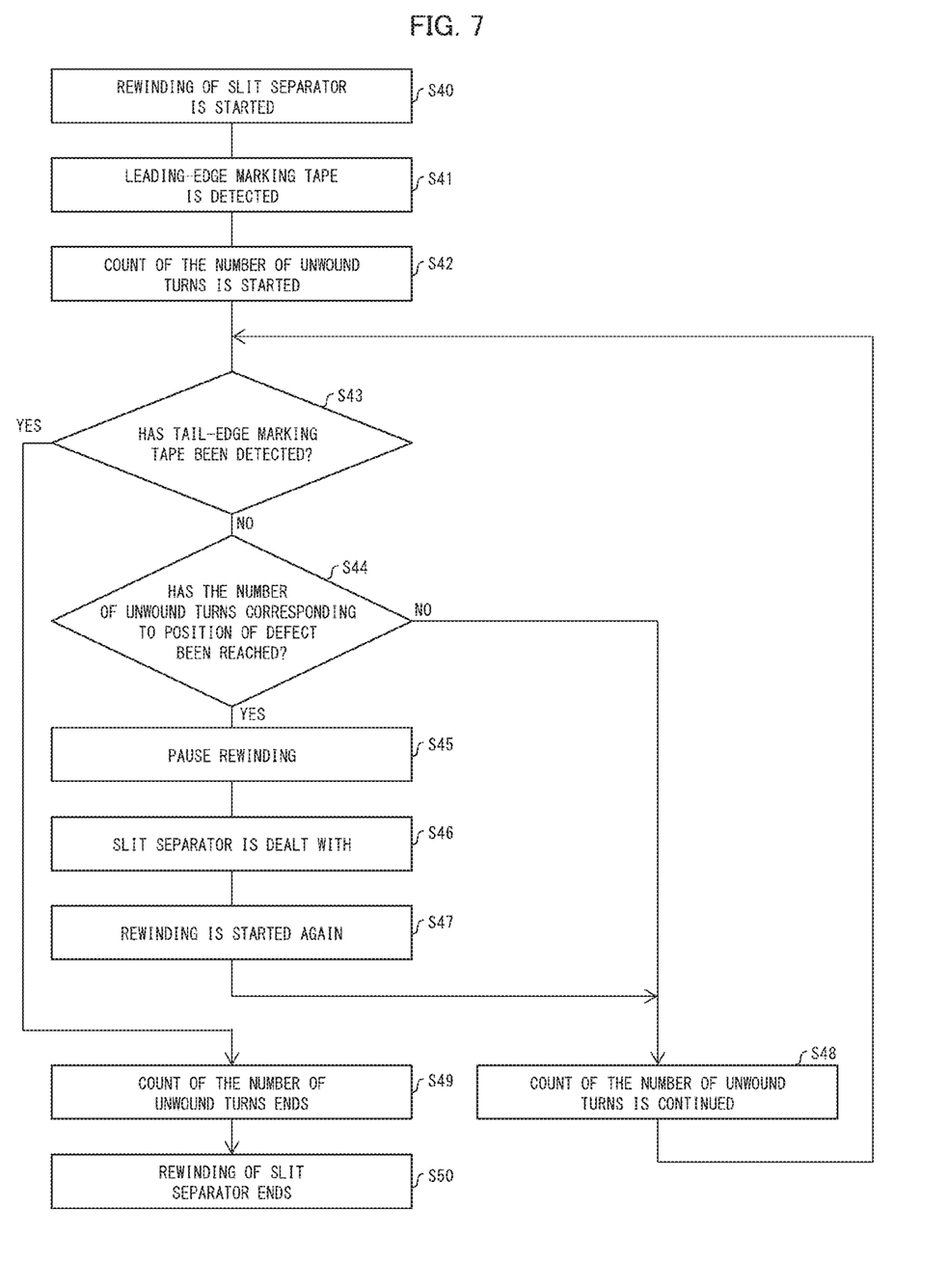
FIG. 7 is a flowchart showing a rewinding step, including rewinding a separator, in accordance with Embodiment 1 of the present invention.

FIG. 7 is a flowchart showing a method of rewinding a slit separator S, which contains a defect D and which has been wound around a core 21, around the core 31 with the use of the rewinding apparatus 30 in accordance with Embodiment 1. The following description will specifically discuss a method of rewinding the slit separator S with reference to FIGS. 6 and 7.

First, winding-off of the slit separator S from the core 21 and winding of the slit separator S around the core 31 are started (step S40). Note here that, in the slit separator S wound around the core 21, a portion provided with the tail-edge marking tape FT is located closer to the center of the core 21 than a portion provided with the leading-edge marking tape ST is to the center of the core 21, and therefore the tape sensor 22 detects the leading-edge marking tape ST first, as illustrated in (a) of FIG. 6 (step S41). The computing device 15 causes the counting sensor 23 to count the number of rotations of the core 21 from when the tape sensor 22 detected the leading-edge marking tape ST. In this way, the rewinding apparatus 30 starts counting the number of unwound turns of the slit separator S (step S42).

In so doing, the number of unwound turns may be counted in the following manner: the computing device 15 reads the total number of turns of the slit separator S from the storage device 16; and the computing device 15 decrements the total number of turns instead of incrementing the number of unwound turns. For example, in a case of the aforementioned example, count of the number of unwound turns may be such that: the total number of turns (i.e., 120) is decremented by one every time the counting sensor 23 detects that a length, which corresponds to one rotation of the core 21, of the slit separator S has been wound off.

Over a period of time during which the number of unwound turns is counted, the tape sensor 22 continues to monitor the presence or absence of detection of the tail-edge marking tape FT (step S43). As long as the tape sensor 22 does not detect the tail-edge marking tape FT, the counting sensor 23 continues to count the number of unwound turns until the number of unwound turns corresponding to the defect D is reached (step S44).

When the number counted by the counting sensor 23 has reached the number of unwound turns corresponding to the defect D, the cores 21 and 31 stop rotating, and thereby the rewinding is paused (step S45). In a case of the foregoing example, when the total number of turns (i.e., 120) has been decremented to the number "60" associated with the defect D, the rewinding apparatus 30 pauses the rewinding of the slit separator S. Thus, the slit separator S is brought to standstill such that the portion containing the defect D appears between the core 21 and the core 31, as illustrated in (b) of FIG. 6.

While the rewinding by the rewinding apparatus 30 is pausing, the slit separator S containing the defect D is dealt with (step S46). First, for example, an operator makes two linear cuts in the slit separator S along the width direction such that the defect D is included in the cut piece. Specifically, for example, the operator cuts the slit separator S along cutoff line C1 and cutoff line C2 illustrated in (b) of FIG. 6. Next, the cut piece of the slit separator S containing the defect D is discarded, and the separated portions of the slit separator S are joined together at joint line C3. In this way, a continuous strip of slit separator S from which the defect D has been removed is obtained as illustrated in (c) of FIG. 6, and this completes the process with respect to the slit separator S. Note that, if necessary, the rewinding may be ended by leaving the cut edge of the core 31-side portion of the slit separator S unjoined. In this case, the cut edge of the core 21-side portion of the slit separator S may be rewound around another core 31.

After the completion of step S46, the cores 21 and 31 start rotating again, and thereby the rewinding is started again (step S47), and the counting sensor 13 continues to count the number of unwound turns (step S48). If the number of unwound turns corresponding to the defect D is not reached in step S44, the process directly proceeds to step S48. Thus, steps S43 to S48 are repeated until all defects D are removed from a region between the leading-edge marking tape ST and the tail-edge marking tape FT of the slit separator S unwound from the core 21.

If the tape sensor 22 has detected the tail-edge marking tape FT in step S43, the computing device 15 causes the counting sensor 23 to stop counting the number of rotations of the core 21 at a point in time of the detection of the tail-edge marking tape FT by the tape sensor 22. This ends the count of the number of unwound turns of the slit separator S by the rewinding apparatus 30 (step S49). After that, the cores 21 and 23 stop rotating, and thereby the rewinding of the slit separator S by the rewinding apparatus 30 ends (step S50).

In the above-described manner, it is possible to obtain, from a separator original sheet W, a plurality of slit separators S containing no defects D, with the use of the separator winding apparatus 10, the separator winding apparatus 20, and the rewinding apparatus 30.

In Embodiment 1, the separator winding apparatuses 10 and 20 are configured such that the position of a defect D in a separator original sheet W or in a slit separator S is specified in association with the number of turns of the separator original sheet W or of the slit separator S. Therefore, even in case where the separator original sheet W or the slit separator S is elastic, it is possible to unfailingly remove the defect D detected during the production of the separator original sheet W or the slit separator S. As such, it is possible to provide a method and apparatus for producing a higher-quality separator original sheet W and a higher-quality slit separator S.

In addition, the separator winding apparatus 20 is capable of determining which of a plurality of slit separators S contains the defect D, together with the position of the defect D in the direction of transfer.

Furthermore, in regard to the separator original sheet W wound off by the separator winding apparatus 20, the position of its defect D is specified by the separator winding apparatus 10 in association with the number of turns. Therefore, by counting the number of unwound turns by the separator winding apparatus 20, it is possible to easily specify when the defect D appears within the detection range covered by the defect sensor 24. This eliminates the need for constant operation of the defect sensor 24.

The same applies to a case where the slit separator S wound by the separator winding apparatus 20 is rewound by the rewinding apparatus 30. As such, in an operation of removing the defect D by an operator with the use of the rewinding apparatus 30, the operator experiences less burden in locating the defect and stopping the rewinding.

In Embodiment 1, the film may be a porous separator for a nonaqueous electrolyte secondary battery. In this case, the following effect is obtained: while the film is undergoing the winding step and while the film is in storage after the winding step, the relationship between the position of a point-of-interest on the film and the number of rotations of a winding core shows no or little change.

Figure 8:
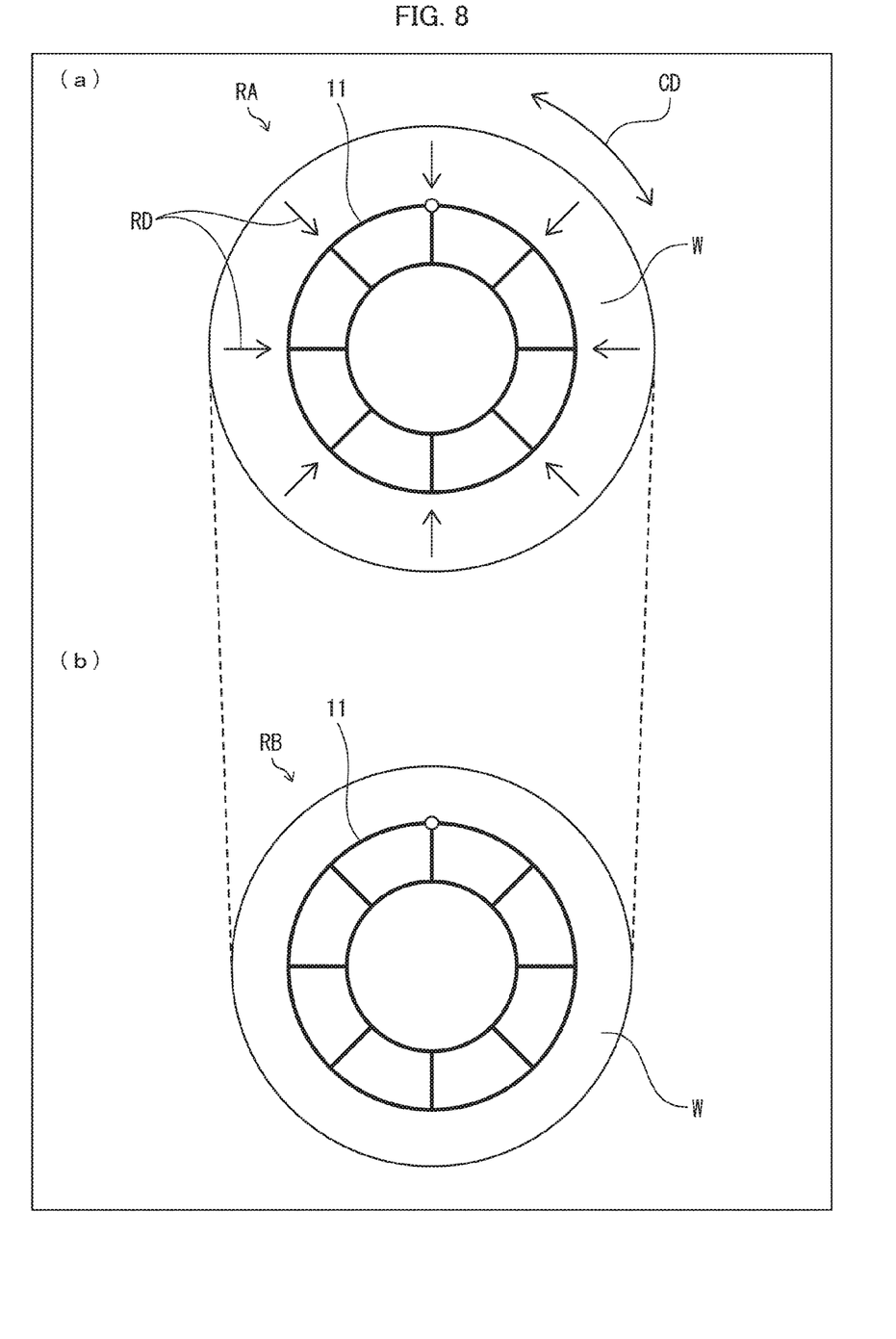
FIG. 8 is a schematic view illustrating how a roll of a separator original sheet wound on a core changes its shape when the roll becomes tighter.

In the above case, since the film is porous, the film stretches upon receiving a tension applied in the winding step and, while being stretched by the tension, the film is wound around the winding core. (a) of FIG. 8 illustrates a roll RA, which is obtained by winding a separator original sheet W around a core 11 in, for example, the winding step illustrated in FIG. 2. In this example, the separator original sheet W wound around the core 11 exerts a contractive force that corresponds to the amount by which the separator original sheet W has been stretched by the tension during the winding. Therefore, the separator original sheet W of the roll RA contracts over time. When the separator original sheet W contracts, a frictional force acts between adjacent layers of the separator original sheet W wound around the core 11. This substantially prevents the adjacent layers of the separator original sheet W from being displaced along the direction in which the separator original sheet W is wound, that is, along the directions indicated by arrows CD shown in (a) of FIG. 8.

Thus, the separator original sheet W of the roll RA changes its shape only in the radial directions of the core 11. Specifically, a roll of the separator original sheet W becomes tighter (i.e., the roll of the separator original sheet W contracts in the radial directions of the core 11 toward the center of the core 11, that is, in the directions indicated by arrows RD), and the separator original sheet W becomes shorter than when it was wound. It follows that the roll RA changes its shape over time into a roll RB, which is smaller in outer diameter than the roll RA (see (b) of FIG. 8). Note that a porous film easily contracts in the length direction and also easily changes its shape in the thickness direction, and therefore the above tightening phenomenon is likely to occur.

The adjacent layers of the separator original sheet W in the roll RA are not or little displaced from each other along the direction in which the separator original sheet W is wound, and therefore the relationship between the position of the defect D in the separator original sheet W and the number of turns of the separator original sheet W wound around the core 11 is the same or substantially the same between the roll RA and the roll RB. As such, according to the method of Embodiment 1 of the present invention, even if the film wound around the winding core has changed its shape because of the foregoing tightening, it is still possible to accurately know the position of a point-of-interest on the film wound around the winding core. A change in length of the film wound around the core, due to the tightening, becomes greater as the length of the film wound around the core increases; therefore, the foregoing effect appears more remarkably in cases of a separator roll whose separator is as long as, for example, 1000 m or longer.

Embodiment 2

Figure 9:
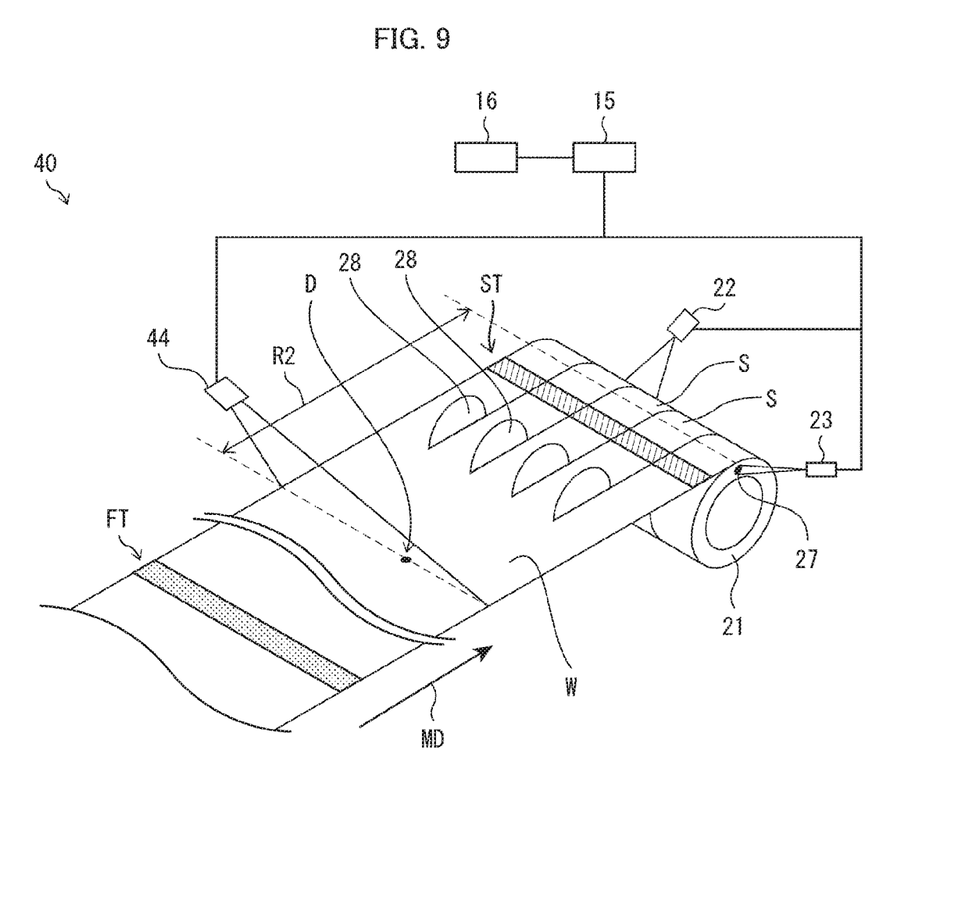
FIG. 9 schematically illustrates a separator winding apparatus in accordance with Embodiment 2 of the present invention.

FIG. 9 schematically illustrates a separator winding apparatus 40 in accordance with Embodiment 2. The separator winding apparatus 40 is different from the foregoing separator winding apparatus 20 in that, according to the separator winding apparatus 40, a separator original sheet W is not wound off from a core 11 but is transferred from somewhere else and then wound around cores 21. The separator winding apparatus 40 includes a defect sensor 44 in place of the defect sensor 24. The separator winding apparatus 40 may be equal in configuration to the foregoing separator winding apparatus 20 except for the above mentioned features.

A winding step carried out by the separator winding apparatus 40, including winding a slit separator S, may be carried out in the same manner as the steps shown in FIG. 2. Note here that, in Embodiment 2, the separator original sheet W is slit into a plurality of slit separators S by a cutter 28 after passing through a detection range covered by the defect sensor 44 but before being wound around the cores 21.

Furthermore, in Embodiment 2, in step S14, the computing device 15 specifies the position of a defect D in the width direction of the separator original sheet W based on the result of detection of the defect D by the defect sensor 44. Furthermore, the computing device 15 determines, based on that position, which of the slit separators S contains the defect D. In step S15, the computing device 15 causes the storage device 16 to store therein not only the number of turns of the separator original sheet W wound around the core 11 at a point in time in which the defect D was specified but also which of the slit separators S contains the defect D.

According to Embodiment 2, it is possible to slit the separator original sheet W into a plurality of slit separators S, and also possible to determine which of the slit separators S contains the defect D and which portion of that slit separator S contains the defect D. As such, it is possible to reduce the number of necessary separator winding apparatuses and simplify the production process, as compared to Embodiment 1.

Embodiment 3

Figure 10:
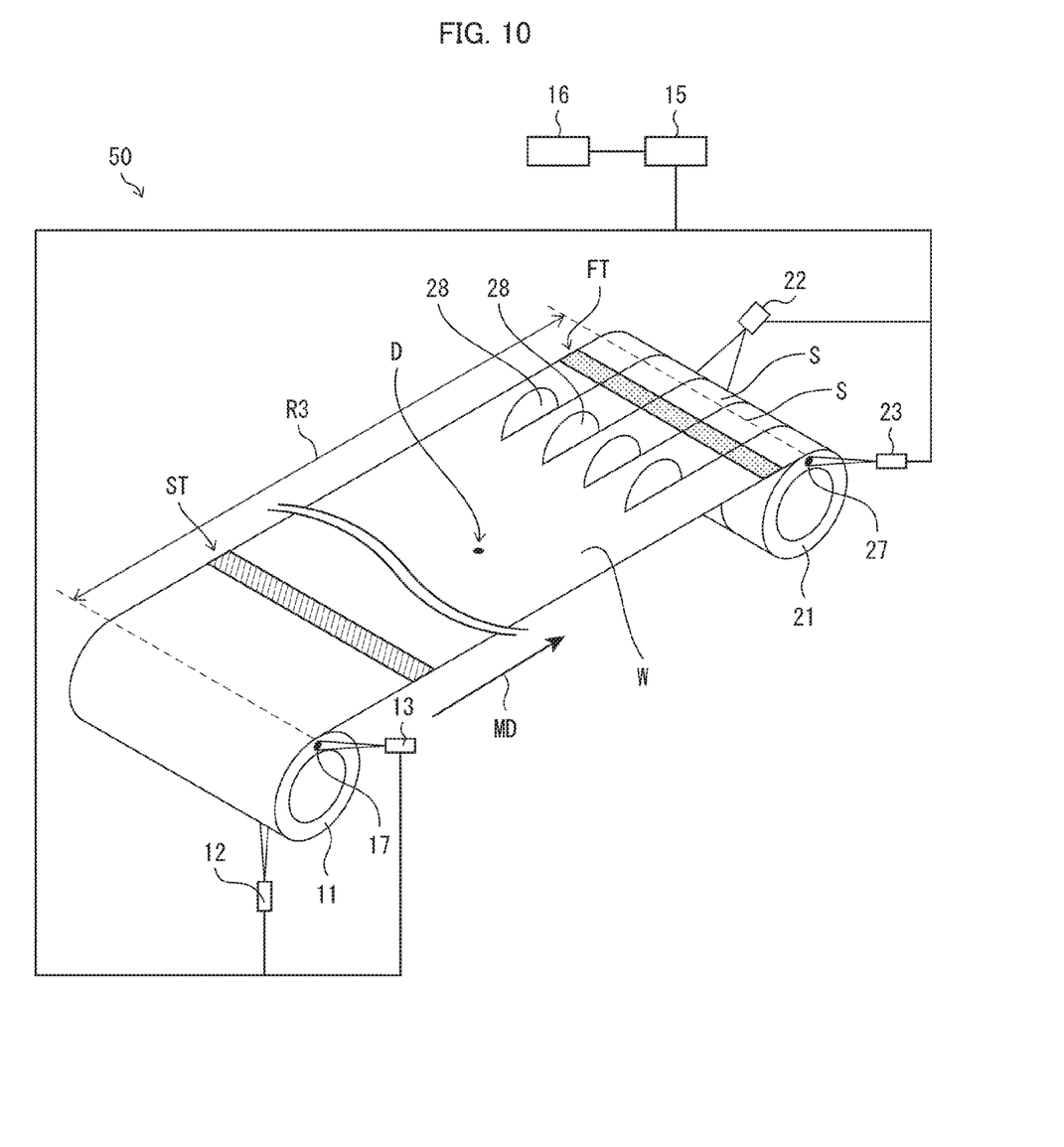
FIG. 10 schematically illustrates a separator winding apparatus in accordance with Embodiment 3 of the present invention.

FIG. 10 schematically illustrates a separator winding apparatus 50 in accordance with Embodiment 3. The separator winding apparatus 50 may be equal in configuration to the foregoing separator winding apparatus 20, except that the separator winding apparatus 50 includes no defect sensor 24. According to the separator winding apparatus 50, during the time from when a certain point on the separator original sheet W is wound off from the core 11 to when the certain point on any of the slit separators S is wound onto the cores 21, the separator original sheet W (or slit separators S) is transferred by distance R3.

In Embodiment 3, the separator original sheet W, which is to be wound off from the core 11 by the separator winding apparatus 50, has been wound around the core 11 by the separator winding apparatus 10. The winding of the separator original sheet W by the separator winding apparatus 10 may be carried out in the same manner as shown in FIG. 2.

The slitting of the separator original sheet W into a plurality of slit separators S by the separator winding apparatus 50, and the winding of the slit separators S around the cores 21 by the separator winding apparatus 50, may be carried out in the same manner as shown in FIG. 5, except that the following is different from that shown in FIG. 5.

Specifically, in Embodiment 3, in steps S27 and S28, the operation of the defect sensor 24 and the detection of a defect are not carried out, and, in step S29, the storing of the number of turns at a point in time of the detection of the defect by the defect sensor 24 is not carried out. Instead, the computing device 15 causes the storage device 16 to store therein the number of turns, of at least one slit separator S wound around a core 21, at a point in time in which the separator original sheet W (or slit separators S) has been transferred by distance R3 from a point in time in which the number of unwound turns counted by the counting sensor 13 reached a number corresponding to the defect. Accordingly, step S30 is not carried out either in Embodiment 3.

The separator winding apparatus 50 may determine that the separator original sheet W (or slit separator S) has been transferred by distance R3 in the same manner as the separator winding apparatus 10 determining that the separator original sheet W has been transferred by distance R1.

As such, the separator winding apparatus 50 is arranged such that the number of turns of a slit separator S wound around a core 21, associated with the position of the defect D, is in synchronization with the number of turns of the separator original sheet W wound around the core 11, which has been associated with the position of the defect D by the separator winding apparatus 10. This makes it unnecessary for the separator winding apparatus 50 to detect the defect D again with the use of the detect sensor 24 in order to determine the number of turns of the slit separator S wound around the core 21 associated with the position of the defect D. As such, the use of the separator winding apparatus 50 further simplifies the step of winding off the separator original sheet W and the step of winding the slit separators S, as compared to cases where the separator winding apparatus 20 is used.

Note that the separator winding apparatus 10 may be arranged such that the defect sensor 14 also detects the position of the defect D in the width direction of the separator original sheet W. Furthermore, the computing device 15 may be arranged to determine, based on the result of the detection, which of the slit separators S will contain the defect D after the separator original sheet W is slit into the slit separators S by the separator winding apparatus 50.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10, 20, 40, 50 separator winding apparatus
11, 21, 31 core 13, 23 counting sensor
14, 24, 441 defect sensor
15 computing device
16 storage device
17, 27 mark
30 rewinding apparatus

The invention claimed is:

1. A method of producing a film, comprising a winding step comprising winding the film around a winding core, the winding step comprising:
 a point-of-interest detecting step comprising detecting a point-of-interest on the film;
 a number-of-turns counting step comprising counting the number of turns of the film wound around the winding core; and
 a number-of-turns storing step comprising storing, in association with the number of turns of the film wound around the winding core, a position of the point-of-interest in a direction of transfer of the film.

2. The method according to claim 1, wherein:
 the winding step further comprises a slitting step comprising slitting the film in the direction of transfer into a plurality of strip-shaped films;
 in the winding step, the plurality of strip-shaped films are wound around a respective plurality of the winding cores; and
 in the number-of-turns storing step, a presence or an absence of the point-of-interest on each of the plurality of winding cores is stored in association with the position and the number of turns.

3. The method according to claim 1, further comprising a rewinding step comprising winding off the film from the winding core and rewinding the film around a rewinding core,
 the rewinding step comprising:
 a number-of-unwound-turns counting step comprising counting the number of turns of the film wound off from the winding core; and
 a pausing step comprising pausing rewinding of the film when, in the number-of-unwound-turns counting step, the number of turns of the film wound off from the winding core has reached the number, which is associated with the position, of turns of the film wound around the winding core.

4. The method according to claim 1, further comprising:
 an unwinding step comprising winding off the film from a wind-off core prior to the winding step; and
 a number-of-unwound-turns storing step comprising storing the position in association with the number of turns of the film wound around the wind-off core prior to the unwinding step,
 the unwinding step comprising a number-of-unwound-turns counting step comprising counting the number of turns of the film unwound from the wind-off core.

5. The method according to claim 4, wherein the detecting in the point-of-interest detecting step is carried out only when, in the number-of-unwound-turns counting step, the number of turns of the film wound off from the wind-off core has reached a number corresponding to the number, which is associated with the position, of turns of the film wound around the wind-off core.

6. The method according to claim 4, wherein the number of turns of the film wound around the wind-off core, the number having been associated with the position in the number-of-unwound-turns storing step, is synchronized with the number of turns of the film wound around the winding core, the number having been associated with the position in the number-of-turns storing step.

7. The method according to claim 1, wherein the film is a separator for a nonaqueous electrolyte secondary battery.

8. A film winding apparatus configured to wind a film around a winding core, comprising:
 a point-of-interest sensor configured to detect a point-of-interest on the film;
 a number-of-turns counting sensor configured to count the number of turns of the film wound around the winding core; and
 a storage device configured to store, in association with the number of turns, a position of the point-of-interest in a direction of transfer of the film.

9. The film winding apparatus according to claim 8, wherein:
 the winding core is provided with a mark on an end face thereof; and
 the number-of-turns counting sensor is configured to count the number of turns by detecting the mark.

10. The film winding apparatus according to claim 8, wherein:
 the winding core comprises (i) an outer peripheral part that has an outer peripheral surface on which the film is wound, (ii) an inner peripheral part arranged to receive a winding shaft, and (iii) a plurality of ribs extending in radial directions from a center of the winding core and connecting the outer peripheral part and the inner peripheral part; and
 the number-of-turns counting sensor is configured to count the number of turns by detecting the plurality of ribs.

11. The film winding apparatus according to claim 8, wherein the film is a separator for a nonaqueous electrolyte secondary battery.

* * * * *